Figure 1:
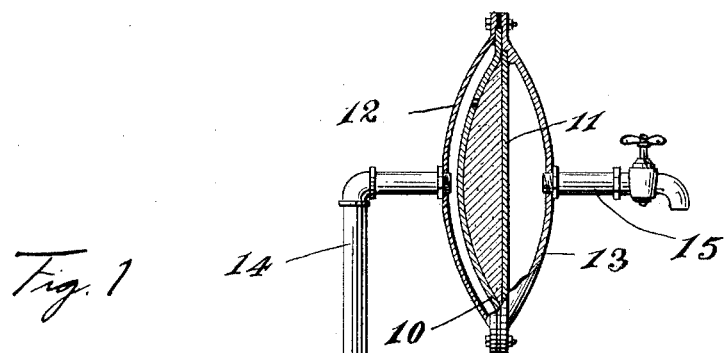

Aug. 6, 1929.  G. C. LEWIS  1,723,564
PURIFICATION OF LIQUIDS

Filed May 5, 1925

Inventor
George C. Lewis
By his Attorneys
Dean, Fairbank, Obright & Hirsch

Patented Aug. 6, 1929.

1,723,564

UNITED STATES PATENT OFFICE.

GEORGE CHARLES LEWIS, OF NEW DORP, NEW YORK.

PURIFICATION OF LIQUIDS.

Application filed May 5, 1925. Serial No. 28,047.

This invention relates to the purification of liquids, and more particularly to the purification of water by the removal of not only the solid matter in suspension, but also the bacteria or other organic matter, and the color and odor. Activated carbon is extensively used in certain industries as a decolorizing agent by adding it to the water to be treated, and thereafter filtering out the activated carbon which is in a very fine state of subdivision. Such processes are not practical for the purification of water, particularly in small quantities for drinking purposes. Various germicides are useful for destroying disease germs or other organisms in drinking water, but in many cases they leave an objectionable color, odor or taste in the water.

I have discovered that by the use of activated carbon as a filter body, germicides may be used and the activated carbon will remove them from the water or retain them, will remove all dead organisms killed by the germicide, will filter out all solid impurities, and will adsorb not only the color and odor resulting from the germicide, but also the color and odor resulting from other dissolved or gaseous ingredients present as impurities. Furthermore the removed or retained germicide held in or by the activated carbon will remain active for a long period.

The activated carbon may be revived from time to time by heat treatment as required, and fresh germicide may be added.

As one feature of my invention I retain the activated carbon in a container having a wall of porous ceramic material through which the water passes before reaching the activated carbon. Thus this wall serves as a preliminary filter medium for removing most of the solid impurities and increases the life of the activated carbon by preventing the contamination of the latter by such solid impurities. The heat treatment of the activated carbon to revivify the latter may take place while in the ceramic container so that the container prevents access of air to the carbon during the heating, and the heating purifies and sterilizes the container.

I may place the carbon in the container before the latter is burned, whereby the high temperature required to burn the ceramic material also acts to greatly increase the activity of the carbon without burning the latter as it is enclosed and protected from the action of the atmosphere.

Various other important features of my invention will be pointed out hereinafter, or will be apparent from a consideration of certain preferred embodiments.

In the accompanying drawing there are illustrated in a somewhat diagrammatic manner two embodiments of my invention. It will of course be understood that these drawings are to be considered in an illustrative rather than a limiting sense, and that various changes may be made in the constructions illustrated without departing from the scope of my invention.

Figure 2:
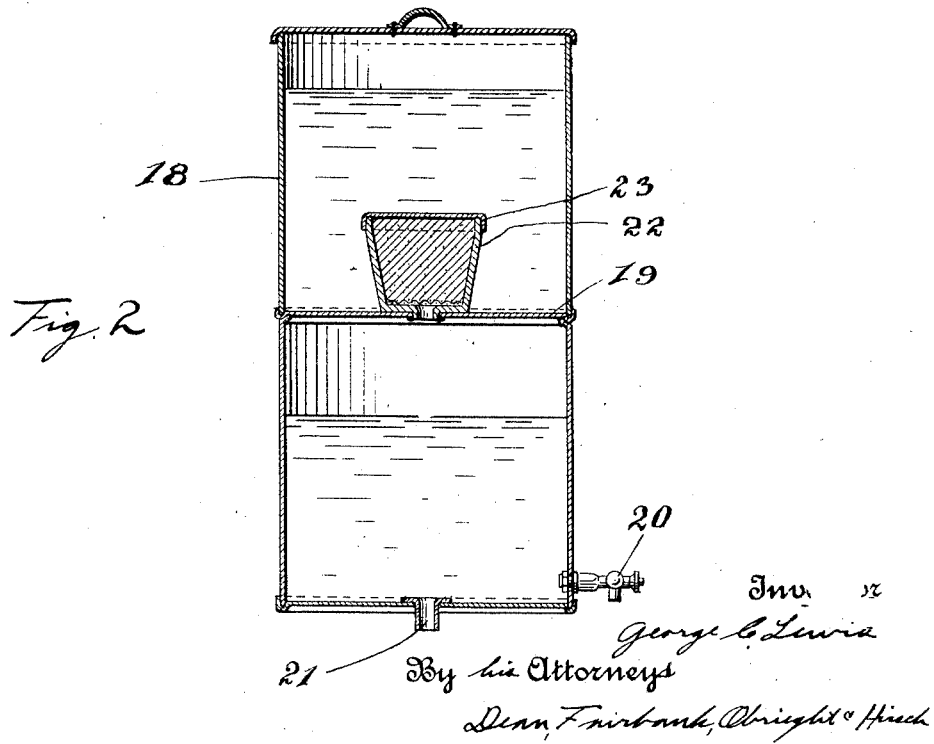

In these drawings:

Fig. 1 is a central longitudinal section through a construction connected in an ordinary water supply system, and Fig. 2 is a section through a different form for use in connection with a water cooler.

In constructing a water filter of the character shown in Fig. 1, I first form a container which includes two sections or wall members, as for instance a dished disk 10 and a cover 11. These are formed of clay or other pottery ware, and before being baked the container is filled with an organic char, preferably an activated carbon, which may or may not have been previously treated to increase its activity. The container is closed with the activated carbon therein, and is then burned to convert the walls of the container into hard, porous, unglazed ceramic material.

The heating may be to a temperature as high as 2500° F., and it will be obvious that the activated carbon is at the same time subjected to substantially the same temperature but is protected from contact with the air. This high heating of the carbon out of contact with the air very greatly increases its adsorptive properties, that is, its capability of removing colors, odors and the like from liquids with which it is brought in contact.

One of the two walls, for instance the wall 10, is ordinarily formed with an aperture therein which may be closed by a plug during the burning operation, and this serves for the admission of germicides to the interior of the container. Such germicides may be potassium permanganate, copper salts, or the like.

To support the container there is provided any suitable form of casing, as for instance a shell having two sections 12 and 13 which may be connected by screws or bolts so as to hold the container therein as a diaphragm subdividing the shell into two compartments. A water supply pipe 14 may be connected to the section 12, while a water outlet 15 may lead from the other section to an ordinary faucet. The pipe 14 may be connected to the ordinary water supply pipe 16 in the rear of the usual faucet 17.

In the operation of the device the porous walls 10 and 11 serve to remove the coarser impurities, but as is well known, finer impurities such as germs and other microorganisms, or colors or odors, may pass through. These are entirely removed by the activated carbon. Color may be imparted to the water by the action of such germicides as potassium permanganate or copper salts, and the activated carbon thus acts not only to remove the dead organisms, but also to remove any color or odor which may have been in the water originally, or which may have been imparted to it from the germicides employed.

The outer shell or container may be of metal or vitreous or other material, and should be so designed that all the water must pass through the filtering medium, and so that it may be opened for the removal of the container which forms the filtering diaphragm or partition therein.

Another form which my invention may assume is shown in Fig. 2 in which there is provided a crock or other vessel 18 having a partition 19 therein forming upper and lower compartments. The lower compartment may have a faucet 20, and may have, instead of said faucet, or in addition thereto, an outlet 21 which may lead to a cooler.

The partition 19 has an aperture therein receiving a container 22 formed of unglazed ceramic material and containing the mass of activated carbon. The container 22 has a cover 23 whereby water in the upper compartment can pass to the lower compartment only by passing through the wall of the container 22 and through the activated carbon therein. The device thus operates in substantially the same manner as the construction shown in Fig. 1. The germicide may be placed in the container 22 with the activated carbon, and the latter may be heated to render it more active while the clay is being burned to form the container.

When the carbon of either form has become exhausted it may be removed and replaced by fresh carbon which may have been treated with or mixed with the germicide. The container itself may be removed from the apparatus and reheated to a high temperature with the fresh activated carbon therein, so as to increase the activity of the latter if desired. If the replacement carbon is not heated in the container it may be put in in a small bag so that the mass of carbon may be removed and replaced without disturbing the porous filtering container therefor.

It will be noted that in my improved construction the outer porous ceramic wall removes the coarser solid impurities of the water before the latter reaches the activated carbon, and thus the carbon is prevented from being contaminated by such impurities.

Having thus described my invention, what I claim as new and desire to secure by Letters Patent is:—

1. A purifying apparatus for drinking water, including a conduit for supplying water under pressure and having a controlling discharge cock and a container interposed between spaced sections of said conduit for holding a limited amount of the water under pressure, said container being formed of two detachably connected walls having the separate sections of said conduit secured thereto, means for sealing the joint between said sections to prevent the escape of water, and a partition subdividing the container into two compartments and having its periphery secured in place between the edge portions of said walls, said partition having spaced separable ceramic walls forming a chamber therebetween, and a filling of activated carbon in said chamber.

2. A purifying apparatus for drinking water, including a conduit for supplying water under pressure and having a controlling discharge cock and a container interposed between spaced sections of said conduit for holding a limited amount of the water under pressure, said container being formed of two detachably connected walls having the separate sections of said conduit secured thereto, means for sealing the joint between said sections to prevent the escape of water, and a partition subdividing the container into two compartments and having spaced separable ceramic walls forming a chamber therebetween, and a filling of activated carbon and a germicide in said chamber.

Signed at New York, in the county of New York and State of New York, this 30th day of April, A. D. 1925.

GEORGE CHARLES LEWIS.